United States Patent
Liu et al.

(10) Patent No.: US 7,286,896 B2
(45) Date of Patent: Oct. 23, 2007

(54) MULTI-FUNCTION TEACH PENDANT FOR A SEMICONDUCTOR MANUFACTURING ENVIRONMENT

(75) Inventors: Te-Hsiang Liu, Hsinchu (TW); Yu-Wen Fang, Taoyuan (TW); Chao-Ying Chiu, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 449 days.

(21) Appl. No.: 10/939,863

(22) Filed: Sep. 13, 2004

(65) Prior Publication Data

US 2006/0058894 A1 Mar. 16, 2006

(51) Int. Cl.
*G06F 19/00* (2006.01)

(52) U.S. Cl. .................. 700/180; 700/19; 700/121; 709/219

(58) Field of Classification Search ............. 700/117, 700/121, 180, 19; 709/219
See application file for complete search history.

(56) References Cited

U.S. PATENT DOCUMENTS 6,813,533 B1 * 11/2004 Semak .................. 700/118
2002/0115433 A1 * 8/2002 Baker .................. 455/420
2002/0156542 A1 * 10/2002 Nandi .................. 700/30
2002/0198964 A1 * 12/2002 Fukazawa et al. ........ 709/219
2003/0045947 A1 * 3/2003 Wampler .............. 700/32
2005/0095774 A1 * 5/2005 Ushiku et al. ........... 438/222

* cited by examiner

*Primary Examiner*—Leo Picard
*Assistant Examiner*—Sheela Rao
(74) *Attorney, Agent, or Firm*—Haynes and Boone, LLP

(57) ABSTRACT

Provided are a device and method for a programmable hand-held device for use in a semiconductor manufacturing environment. In one example, the device includes an interface, a processor, an input device, and a memory. The interface may establish a connection between the device and at least one of the process tools. The processor may process executable instructions. The input device may receive input instructions for programming a specific type of tool. The memory contains the executable instructions, which may be divided into multiple subsets of instructions, where each subset is adapted for communication with a specific type of tool. The instructions may include identifying the specific type of tool referenced by the input instructions, selecting the subset of instructions adapted for communication with the selected specific type of tool, and programming the selected specific type of tool via the interface using the subset of instructions and the input instructions.

20 Claims, 6 Drawing Sheets

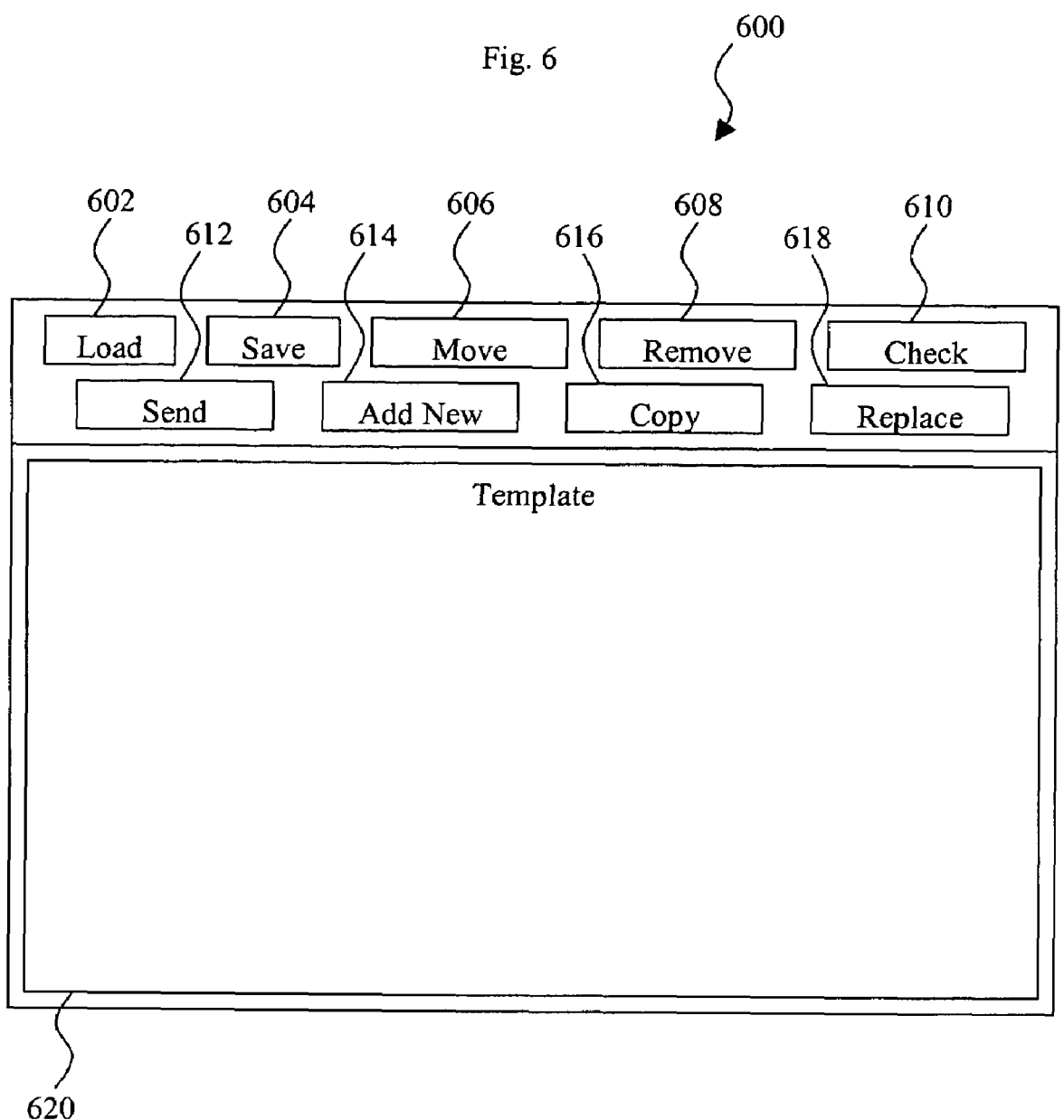

MULTI-FUNCTION TEACH PENDANT FOR A SEMICONDUCTOR MANUFACTURING ENVIRONMENT

TECHNICAL FIELD

The present disclosure relates generally to a system and method for remotely controlling semiconductor manufacturing equipment in a semiconductor manufacturing environment and, more specifically, to a method and system for two-way remote control of multiple types of such equipment using a hand held device.

BACKGROUND

In a semiconductor manufacturing business, such as a semiconductor foundry, information technology (IT) services provide cohesion to internal and external customers, as well as to technologies employed in making semiconductor devices. A semiconductor foundry may utilize processing equipment coupled to a network of computing devices, robotics, customers, and manufacturing equipment. The business operations of the semiconductor foundry may rely on electronic information exchanged among many different entities using the network. This information may be used to control manufacturing equipment, conduct product analysis, and for other business and engineering applications.

The amount of information and the relatively large number of tools and other pieces of equipment used to perform the manufacturing process in the semiconductor foundry may be difficult to maintain. For example, if a tool or piece of equipment is designed to permit the entry of control functions, diagnostic commands, or other data, it may be necessary for a user to attach a laptop computer or other relatively bulky device to the tool in order for such interaction to be achieved. Some tools enable a user to control tool functions through a remote hand held electronic device. However, such hand held devices are generally associated with a single tool, and may not permit the user to easily interact with various other tools using the same device.

Accordingly, what is needed is a system and method thereof that addresses the above discussed issues.

BRIEF DESCRIPTION OF THE DRAWINGS

FIG. 6 illustrates a schematic view of one embodiment of a graphical user interface (GUI) of the two-way hand held remote control device of FIG. 3.

DETAILED DESCRIPTION

Figure 1:
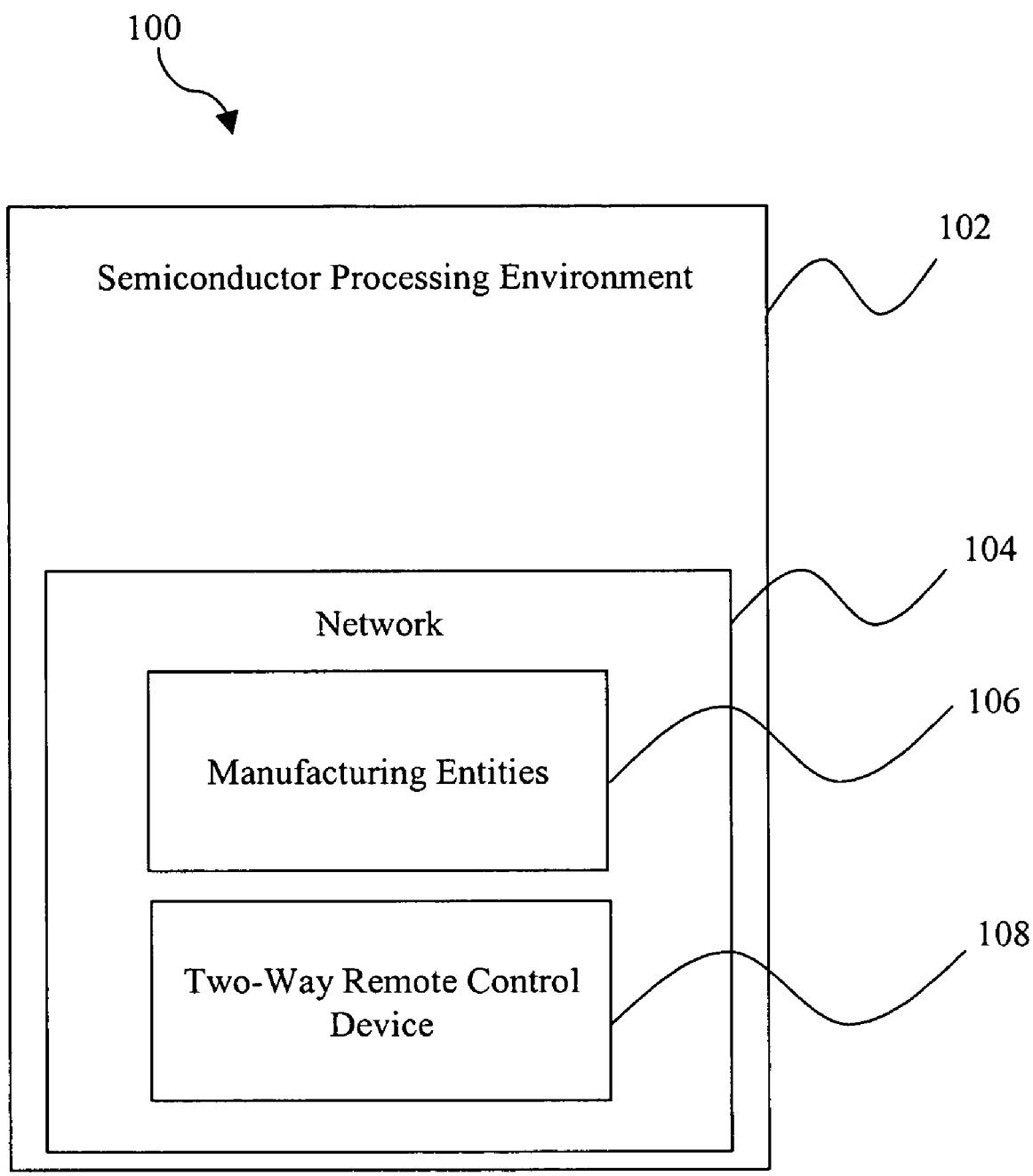
FIG. 1 illustrates a schematic view of one embodiment of an exemplary semiconductor manufacturing system having a two-way hand held remote control device.

The present disclosure relates generally to a system and method for remotely controlling semiconductor manufacturing equipment in a semiconductor manufacturing environment and, more specifically, to a method and system for two-way remote control of multiple types of such equipment using a hand held device. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, a schematic view of one embodiment of a system 100 constructed according to aspects of the present disclosure is illustrated. The system 100 includes a semiconductor fabrication environment 102, a network 104, one or more manufacturing entities 106, and a two-way remote control device 108.

In the present example, the fabrication environment 102 is a semiconductor foundry that includes multiple manufacturing facilities for the fabrication of a variety of different semiconductor products. For example, there may be at least one manufacturing facility for the front end fabrication of semiconductor products, while a second manufacturing facility may provide the back end fabrication for the packaging of the semiconductor products, and a third manufacturing facility may provide other services (e.g., testing, shipping, etc.) for the foundry. The foundry may further include other fabrication facilities interconnected through the network 104.

The network 104 may include a plurality of interconnecting nodes (not shown) for the communication of manufacturing information. The information may include a plurality of messages for the control and extraction of information from the process tool(s) 106. The network may include wired and/or wireless connections. The network 104 may further provide interconnectivity between manufacturing facilities of the semiconductor fabrication environment 102.

The manufacturing entity 106 includes a plurality of manufacturing process tools, metrology tools, customer interfaces, manufacturing execution systems, and/or other entities associated with the semiconductor fabrication environment 102.

The two-way remote communication device 108, in one embodiment, may be a wired and/or wireless electronic control device. For example, the two-way remote communication device 108 may include a personal digital assistant (PDA), a mobile phone, a pager, or another portable electronic device. The two-way remote communication device 108 may communicate to the process tool 106 directly through a wired interface, or though a wireless interface such as infra-red communication, IEEE 802.11b, IEEE 802.11g, or BlueTooth®. The two-way remote communication device 108 may interact with the plurality of process tool(s) 106, and execute functions of each process tool 106 through the network 104 of the semiconductor fabrication environment 102.

Figure 2:
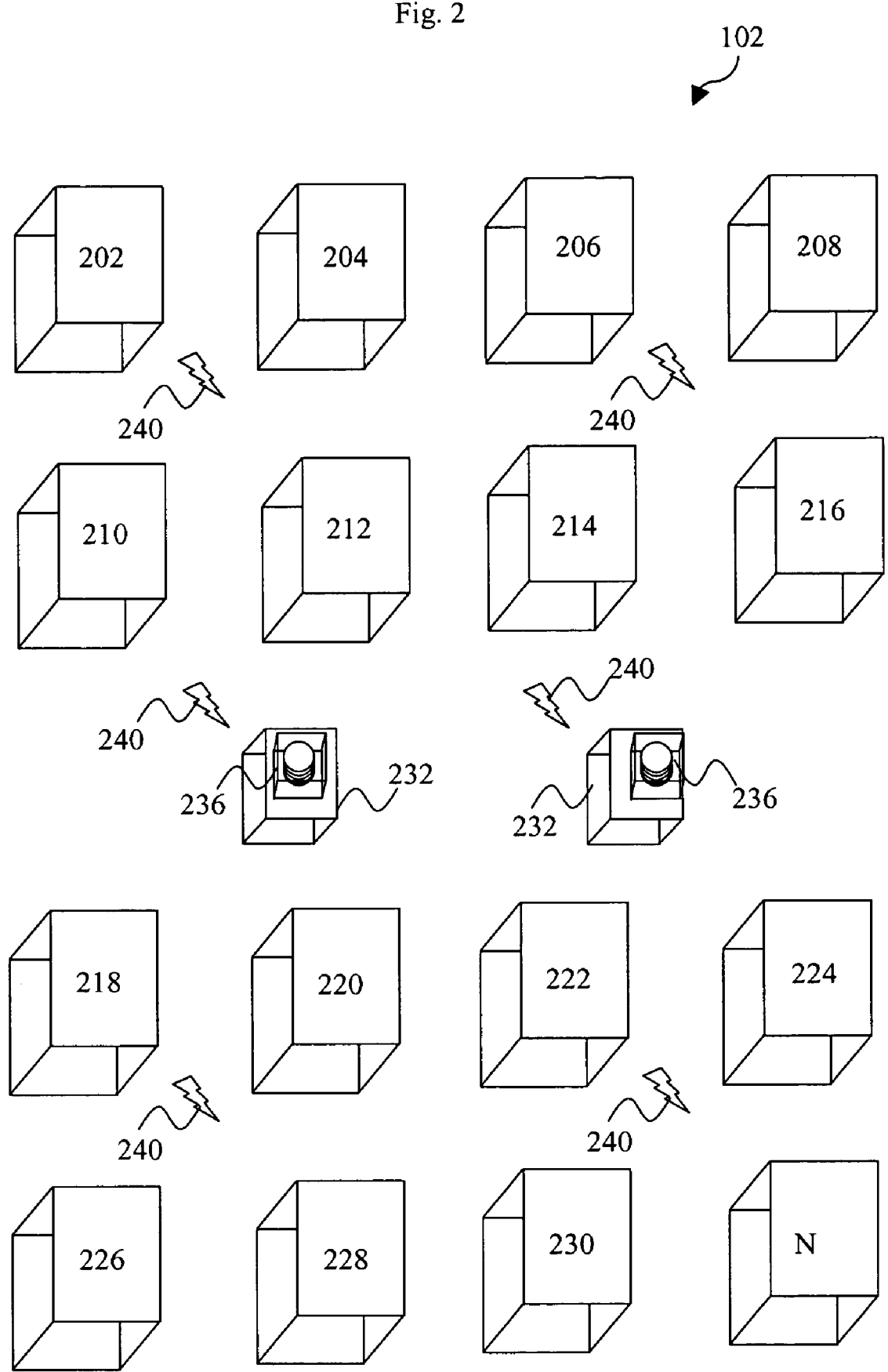
FIG. 2 illustrates a schematic view of a more detailed example of the semiconductor manufacturing system of FIG. 1.

Referring to FIG. 2, illustrated is a schematic of one embodiment of the semiconductor fabrication environment 102. The semiconductor fabrication environment 102 includes a plurality of process tool(s) 202-N, product loader(s) 232, product lot(s) 236, and communication node(s) 240.

The process tool(s) 202-N may include of a myriad of semiconductor manufacturing equipment for the formation of semiconductor devices. The process tool(s) 202-N may include manufacturing equipment for lithography, etching, cleaning, thin film formation, packaging, and/or other manufacturing processes. The process tools 202-N may include singular process platforms and/or clustered platforms, wherein a plurality of manufacturing processes may be grouped into one process tool 202.

The product loaders 232 may include manufacturing equipment for the transferal of semiconductor substrates between product lots 236. The product loaders 232 may include a plurality of mechanical handling devices to allow for the sorting and splitting of product lots 236. The product loaders 232 may provide substrate randomization and/or substrate-to-slot position tracking within the product lots 236. The product loaders 232 may also provide for tracking information of splits, merges, and other lot-to-lot transfers through the network 104. The product loaders 232 may include of an enclosed environment wherein the ambient temperature, humidity, and/or the particle density may be controlled. For example, one or more of the product loaders 232 may be enclosed within a sub-Class 1 clean room environment comprising an air recirculation system, a plurality of high efficiency particle absorber (HEPA) and/or ultra low penetration (ULPA) filter(s).

The product lots 236 include a plurality of semiconductor substrates and/or semiconductor wafers. The diameter of the wafers may range between about 50 mm and about 600 mm. The wafers may also have a thickness ranging between about 6 mm and about 0.01 mm. The wafers may be included of silicon, strained silicon, silicon, germanium, diamond, gallium arsenide, and/or other semiconductor materials. The substrates may further include a plurality of partially and/or fully fabricated semiconductor devices. The product lots 236 may also include a sub-Class 1 clean room environment including a closed container for storing a plurality of wafers.

The plurality of communication nodes 240 include wired and/or wireless interconnection of the plurality of process tools 202-N. The communication nodes 240 may include a plurality wireless routers for receiving, transmitting, and routing messages between the process tools 202-N. The communication nodes 240 may also include wired and/or wireless remote controllers, such as computing devices, PDA, mobile phones, and/or other electronic devices.

Figure 3:
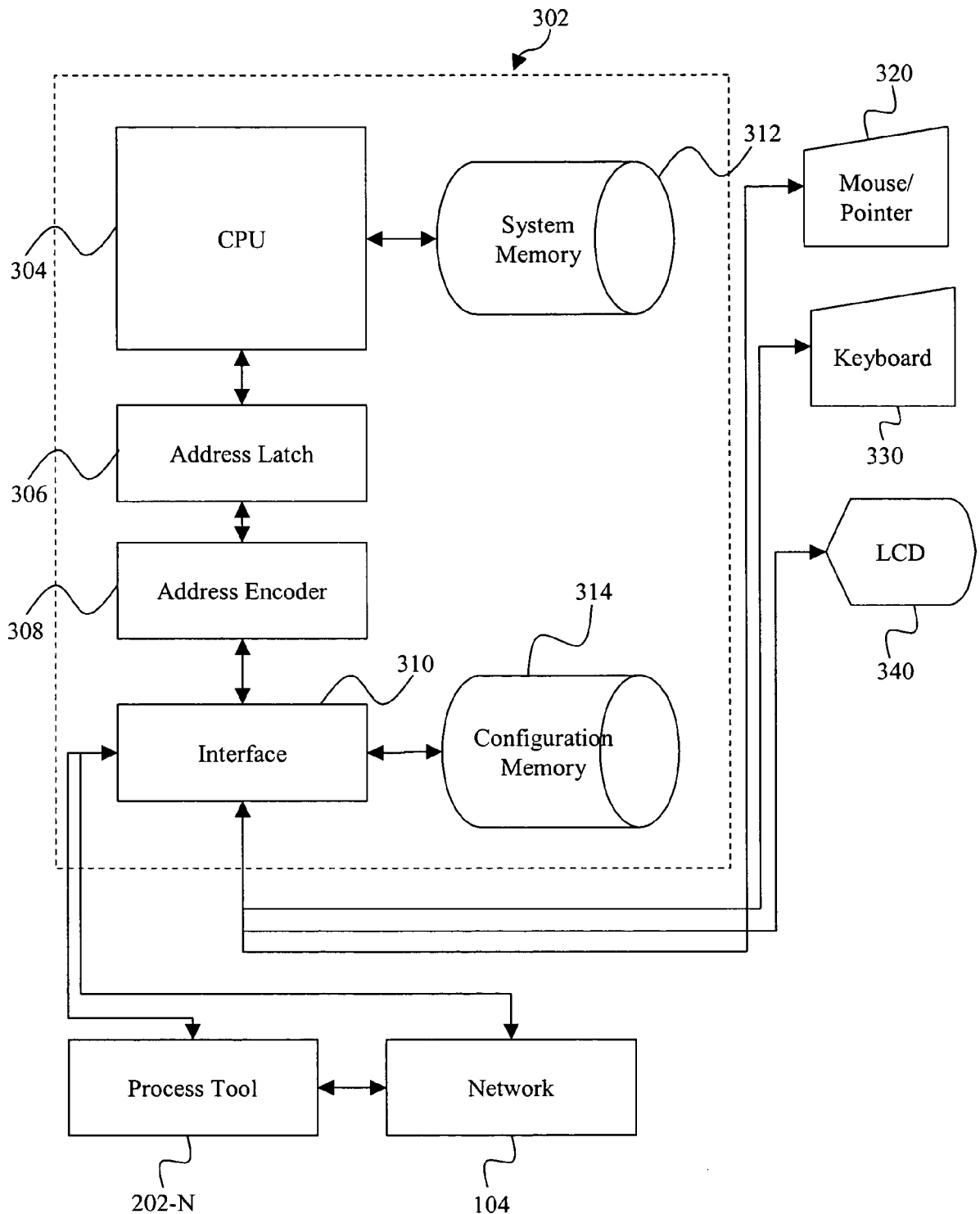
FIG. 3 illustrates a schematic view of one embodiment of a two-way hand held remote control system.

Referring to FIG. 3, illustrated is a schematic view of one embodiment of a two-way remote control device (e.g., the device 108 of FIG. 1) constructed according to aspects of the present disclosure. The two-way remote control device 108 includes a controller 302 that may interact with the process tools 202-N, the network 104, and a plurality of input/output (I/O) devices 320-340. It is noted that some or all of the I/O devices 320-340 may be integrated with the two-way remote control device 108.

The controller 302 includes one or more interconnected computing devices and memory storage devices that provide messaging and control instructions to the process tools 202-N. For example, the controller 302 may include at least one central processing unit (CPU) 304, an address latch 306, an address encoder 308, an interface 310, a system memory storage 312, a configuration memory storage 314, and/or other components.

The CPU 304 may provide for processing of messaging and commands to the process tools 202-N. The commands may provide for the operation of a mechanical motor, a sensor, and/or other components of the process tools 202-N. The processing may provide computational functions for logical functions such as floating point operations, integer operations, and the processing of information from the address latch 306, the address encoder 308, and the interface 310, as well as other components that be part of or connected to the controller 302. The CPU 304 may provide other processing functions for the I/O device(s) 320-340, and may further include instructions for communicating via the network 104.

The address latch 306 and the address encoder 308 may include a plurality of hardware and/or software components adapted for the processing of instructions between the CPU 304 and the interface 310.

The system memory storage 312 and the configuration memory storage 314 may provide for the storage of information from the CPU 304 and for the interface 310. The configuration memory storage 314 may provide for the storage of a plurality of remote control configurations. The remote control configurations may include a plurality of instructions for simulating a plurality of different process tool(s) 202-N, and/or a plurality of different controller(s) 302. The configuration memory storage 314 may also include a plurality of instructions for translating the remote control configurations into the operational language of the controller 302. For example, the configuration memory storage 314 may include one set of instructions for the configuration information of a thin film deposition and/or atomic layer deposition (ALD) process tool, a second set of instructions for the product loader 232, a third set of instructions for a mobile phone, and a fourth set of instructions for a metrology process tool. Accordingly, because each tool may interact with a separate device and/or program for control and configuration purposes, the instructions may simulate various devices and/or programs as needed. Furthermore, the controller 302 may simulate functions associated with a plurality of different tools. For example, the controller 302 may simulate programs for indexer configuration (e.g., position parameters, movement velocity, etc.), calibration (e.g., wafer sensors, slots sensors, protrusion sensors), verification (e.g., self tests, auto cycles), and troubleshooting (e.g., motors, home, clear alarm, etc.)

It is understood that the system memory storage 312 and the configuration memory storage 314 may be a single memory. In other embodiments, the memories may be distributed via a network, and accessible to the controller 302 via a network. Accordingly, data and instructions used by the controller 302 may be located solely within the controller, may be distributed and accessible via a network, or may be stored on a combination of local and distributed storage devices (e.g., memories). In some examples, the controller 302 may search local storage for needed instructions and/or data before accessing a distributed storage device, while in other examples the controller 302 may access a distributed storage device without first searching local storage. It is understood that the controller 302 may be programmed with various permissions (e.g., passwords) needed to access distributed storage, or a user may be prompted to enter verification and/or authorization codes prior to the controller 302 gaining such access.

Figure 4:
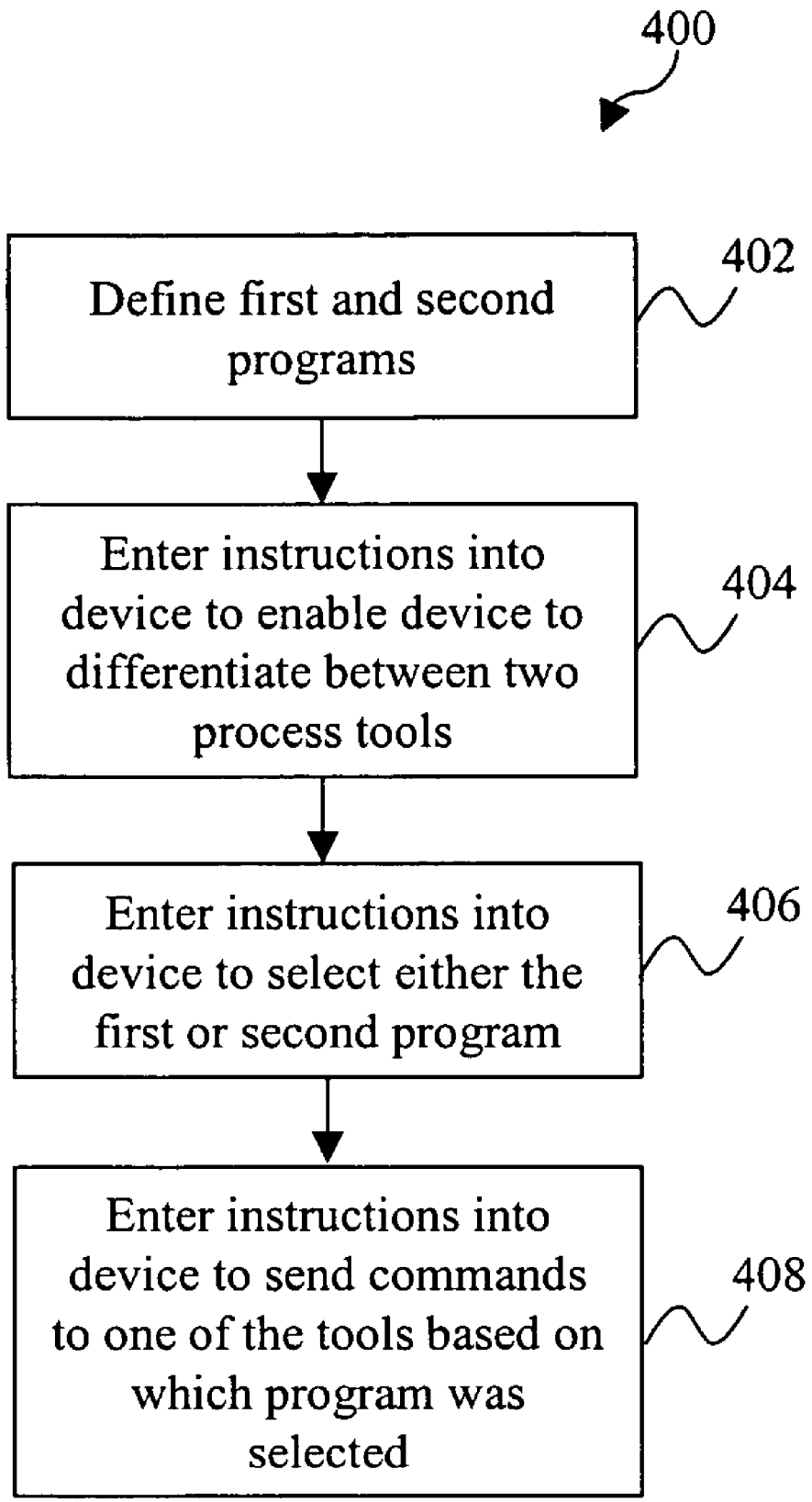
FIG. 4 illustrates a flow chart of an exemplary method for using the two-way hand held remote control device of FIG. 3 to control one of a plurality of different tools.

The interface 310 may include a plurality of hardware and/or software based instructions adapted for the communication with the process tool(s) 202-N, the product loader(s) 232, the network 104, the I/O devices 320-340, system memory storage 312, the configuration memory storage 314, the address encoder 308, and other components of the controller 302. The hardware portions of the interface 310 may include wired connections such as RS232, universal serial bus (USB), IEEE 1894, and/or other connections. Alternatively or additionally, the interface 310 may include wireless communication connections such as infra-red, IEEE 802.11b, IEEE 802.11g, BlueTooth®, and/or other wireless connections. Although shown as a single interface, it is understood that the interface 310 may be multiple interfaces. 291 Referring to FIG. 4, in one embodiment, a flow chart illustrates an exemplary method 400 that may be used to configure a hand-held device (e.g., the device 108 of FIG. 1) for interaction with multiple process tools in a semiconductor processing environment. In step 402, the method 400 defines, within the device 108, at least two programs. The first program simulates a device able to communicate with one process tool and the second program simulates a device able to communicate with another process tool. Neither tool can communicate with the program used for the other tool. In step 404, instructions may be entered into the device 108 to enable the device 108 to differentiate between the two tools. In step 404, instructions may be entered into the device 108 to select either the first or second program. In step 406, additional instructions may be entered into the device 108. These instructions may include commands to send to one of the process tools based on whether the first or second program was selected.

In another embodiment, the method 400 may include establishing communication between the device 108 and one of the tools. The method 400 may then automatically detect whether the device 108 is communicating with the first or second tool. Once the detection occurs, the method may select the first or second program without needing user intervention.

In still another embodiment, the method 400 may enable the device 108 to access storage devices via a network to retrieve data and/or instructions. In some examples, such access may occur during execution of the first or second program.

Figure 5:
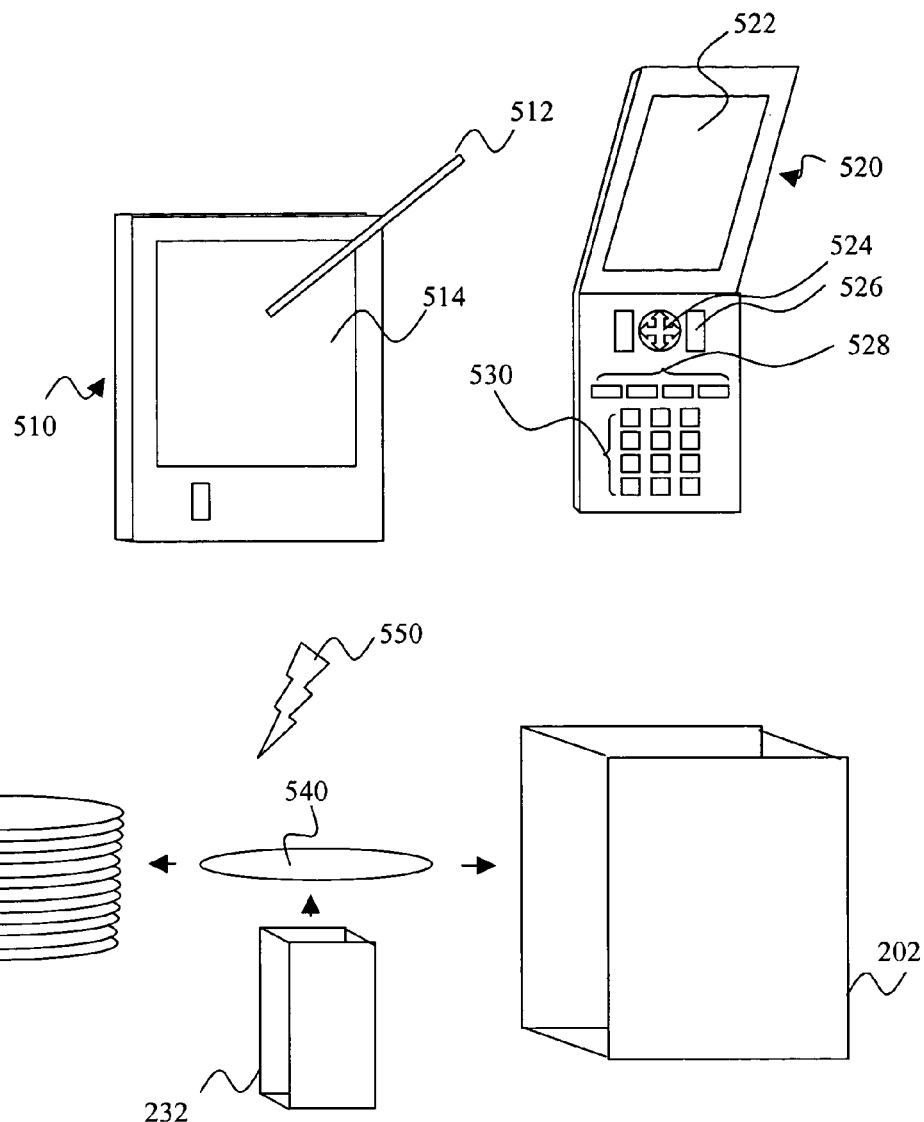
FIG. 5 illustrates exemplary physical implementations of the two-way hand held remote control device of FIG. 3 in the manufacturing system of FIG. 2.

Referring to FIG. 5, a system 500 illustrates two exemplary hand-held remote control devices 510, 520, a product loader 232, and a process tool 202. For purposes of illustration, the hand-held remote control devices 510, 520 include a PDA and a mobile phone, respectively. The hand-held remote control devices 510, 520 may be connected either directly or indirectly via wireless and/or wireless messaging (denoted by reference numeral 550) to the product loader 232, a container (not shown) for the product lot 236, and/or the process tool 202.

The PDA 510 may include a display 514 and a stylus 512 for selecting graphical objects on the display 514. The graphical objects may include buttons for executing commands for controlling various components of the system 500, for performing diagnostics, etc.

The mobile phone 520 may include a display 522, a selector pad 524, and selection buttons 526, 528, and 530. The display 522 may include graphical objects of commands. The graphical objects may include buttons for executing commands for controlling various components of the system 500, for performing diagnostics, etc. The selector pad 524 provides for the selection and manipulation of the graphical objects within the display 522. The selector pad 524 may also provide for manual control of mechanical robotic systems within the system 500. For example, the selector pad 524 may allow an operator to move a wafer 540 to different locations between the container for the product lot 236 and the process tool 202. The selection buttons 526, 528, and 530 provide for the input of information and for the selection of the graphical object(s) selected by the selector pad 524.

Referring to FIG. 6, illustrated is a schematic view of an exemplary graphical user interface (GUI) 600 that may be present on a two-way remote control device (e.g., the device 108 of FIG. 1). The GUI 600 may be included in the display 514 and 522 of the PDA 510 and the mobile phone 520, respectively. The GUI 600 includes a template 620 and a plurality of graphical keys such as LOAD 602, SAVE 604, MOVE 606, REMOVE 608, CHECK 610, SEND 612, ADD NEW 614, COPY 616, and REPLACE 618.

The LOAD key 602 provides for the insertion of information to the product loader 232 and/or the process tool 202. The information may include process recipe parameters, process sequences, and/or other manufacturing related information. The SAVE 604 key provides for the activation of a storage event wherein the information within the controller 302 may be stored.

The MOVE 606 key and the REMOVE 608 key provide for the movement and/or removal of information, product lot 236, wafer 540, etc. The REMOVE 608 key may also provide for the deletion of information and graphical object(s) within the template 620.

The CHECK 610 key and the SEND 612 key provide for the verification and transport of information associated with the product lot 236, wafer 540, etc. The CHECK 610 key may also provide for the verification of information with respect to other information associated with the product lot 236, wafer 540, etc. For example, the verification may include the retrieval of status information from the product loader 236, wherein the status information may include wafer count, wafer position, and/or other information. The SEND 612 key may further include the execution of an operation to move product lot(s) 236 and/or wafer(s) 540 between product loader(s) 232 and/or the process tool(s) 202-N. Alternatively, the SEND 612 key may include the operation of transporting information between product loader 232 and the process tool 202.

The ADD NEW 614 key, the COPY 616 key, and the REPLACE 618 key provide for the entry, amendment, and duplication of information associated with the product lot 236 and wafer 540. The ADD NEW 614 key may provide for the addition of graphical objects, process recipes, process sequences, process parameters, and/or other information associated with the product lot 236, wafer 540, product loader 232, and/or the process tool 202. The COPY 616 key and the REPLACE 618 key may provide for the duplication and insertion of graphical objects, process recipes, process sequences, process parameters, and/or other information associated with the product lot 236, wafer 540, product loader 232, and/or the process tool 202.

The template 620 may include multiple graphical objects adapted for the control of the product lot 236, wafer 540, product loader 232, and/or the process tool 202. The template 620 may include the display of information associated with work in progress (WIP), process tool 202 status, maintenance schedules, product specifications, equipment specifications, procedures, and/or other information.

Although embodiments of the present disclosure have been described in detail, those skilled in the art should understand that they may make various changes, substitutions and alterations herein without departing from the spirit and scope of the present disclosure. For example, various steps may be performed in a different order than that described, may be removed, or may be performed in parallel. Furthermore, additional steps may be added, and each step may be replaced by smaller or more detailed steps. In addition, multiple steps may be combined into a single step, and various functions may be combined or separated. Also, the various tools described above are for purposes of example only, and it is understood that the device 108 may be used to perform various functions with respect to a wide variety of tools in a semiconductor manufacturing environment. Accordingly, all such changes, substitutions and alterations are intended to be included within the scope of the present disclosure as defined in the following claims.

What is claimed is:

1. A programmable hand-held device for use in communicating with a plurality of manufacturing equipment in a semiconductor manufacturing environment, the device comprising:
   an interface adapted for establishing a connection between the device and at least two of the plurality of manufacturing equipment, wherein at least one of the plurality of manufacturing equipment is remotely controllable;
   a processor operable to process executable instructions;
   an input device for receiving input instructions for communicating with one of the plurality of manufacturing equipment; and
   a memory containing the executable instructions accessible to the processor, wherein at least a portion of the executable instructions are divided into multiple subsets of instructions, wherein a first subset of instructions is adapted for communication with a first one of the plurality of manufacturing equipment and at least one other subset of instructions is adapted for communication with a second one of the plurality of manufacturing equipment, wherein the second one of the plurality of manufacturing equipment performs a different manufacturing function than the first one of the plurality of manufacturing equipment, the executable instructions further including:
      identification instructions for identifying a selected one of the plurality of manufacturing equipment;
      selection instructions for selecting a subset of instructions adapted for communication with the selected one of the plurality of manufacturing equipment; and
      simulating instructions for simulating a control device able to interact with the selected one of the plurality of manufacturing equipment via the interface using the subset of instructions and the input instructions.

2. The programmable hand-held device of claim 1 further comprising:
   instructions for automatically detecting the selected one of the plurality of manufacturing equipment; and
   instructions for automatically configuring the interface to establish the connection with the selected one of the plurality of manufacturing equipment tool based on the automatic detection.

3. The programmable hand-held device of claim 1 wherein each subset of instructions comprises a program for simulating a program on a control device able to communicate with the selected one of the plurality of manufacturing equipment.

4. The programmable hand-held device of claim 1 wherein the interface is wireless.

5. The programmable hand-held device of claim 1 further comprising graphical interface instructions for providing a graphical user interface on a user-viewable screen associated with the device.

6. The programmable hand-held device of claim 5 further comprising instructions for uploading at least some of the graphical user instructions into the memory.

7. The programmable hand-held device of claim 1 wherein the input device includes a keypad.

8. A method for configuring a hand-held device for interaction with multiple process tools in a semiconductor processing environment, the method comprising:
   defining, within the device, at least a first program for simulating a first device able to communicate with a first process tool and a second program for simulating a second device able to communicate with a second process tool;
   entering a first set of instructions into the device, wherein the first set of instructions enable the device to differentiate between the first and second process tools;
   entering a second set of instructions into the device, wherein the second set of instructions select either the first or second program; and
   entering a third set of instructions into the device, wherein the third set of instructions includes commands to send to the first or second tool, wherein the commands are sent to the first or second tool based on whether the first or second program was selected.

9. The method of claim 8 further comprising defining a related set of actions within the device, wherein selecting one of the related actions automatically selects the remaining related actions.

10. The method of claim 8 further comprising defining a graphical user interface on a user-viewable screen associated with the device.

11. The method of claim 10 further comprising entering at least one of the first, second, and third sets of instructions using the graphical user interface.

12. The method of claim 8 further comprising:
   establishing communication between the device and one of the first and second tools; and
   automatically detecting, by the device, whether the device is communicating with the first or second tool.

13. The method of claim 8 wherein the third set of instructions includes operation parameters.

14. The method of claim 8 wherein the third set of instructions includes diagnostics commands.

15. A system for programming multiple process tools in a semiconductor manufacturing environment, the system comprising:
   a network;
   first and second process tools accessible to the network; and
   a hand-held device configured to simulate a first program for communicating with the first process tool and a second program for communicating with the second process tool, the hand-held device including:
      an interface adapted for establishing a connection between the device and the first and second process tools;
      a processor operable to process executable instructions;
      an input device for receiving input instructions for programming the first and second process tools; and
      a memory containing the executable instructions accessible to the processor, wherein the executable instructions are divided into at least a first set of instructions for simulating the first program and a second set of instructions for simulating the second program, the instructions including:
         instructions for identifying whether the handheld device is to communicate with the first or second process tool;
         instructions for selecting the first or second set of instructions based on whether the handheld device is to communicate with the first or second process tool, respectively; and instructions for programming the first or second tool using the simulated first or second program, respectively.

16. The system of claim 15 wherein the programmable hand-held device further comprises:
   instructions for automatically detecting the first or second process tool; and
   instructions for automatically configuring the interface to establish the connection with the detected first or second process tool.

17. The system of claim 15 wherein the programmable hand-held device further comprises instructions for transferring operation parameters to the first or second tool.

18. The system of claim 15 wherein the programmable hand-held device further comprises instructions for sending diagnostics commands to the first or second tool.

19. The system of claim 15 further comprising:
   a memory device distributed from the hand-held device and accessible to the hand-held device via the network; and
   instructions, on the hand-held device, for accessing data stored in the memory device via the network.

20. The system of claim 19 wherein the data is accessed from the memory device during the programming of the first or second tool using the simulated first or second program.

* * * * *